United States Patent [19]
Downs et al.

[11] Patent Number: 5,754,960
[45] Date of Patent: May 19, 1998

[54] DISPLAY CONSOLE AND USER INTERFACE FOR MULTISITE RF TRUNKED SYSTEM

[75] Inventors: Stephen R. Downs; Charles P. Brame. both of Forest; Satish Kappagantula. Lynchburg, all of Va.

[73] Assignee: Ericsson Inc., Research Triangle Park, N.C.

[21] Appl. No.: 835,689

[22] Filed: Feb. 14, 1992

Related U.S. Application Data

[63] Continuation-in-part of Ser. No. 825,689, Feb. 22, 1991, Pat. No. 5,200,954.

[51] Int. Cl.$^6$ ...................................................... H04B 7/00
[52] U.S. Cl. ........................... 455/508; 455/520; 381/123; 379/267
[58] Field of Search ............................ 455/15, 33.1, 53.1, 455/54.1; 379/59, 63, 203, 204, 267, 142; 340/721, 712; 381/123

[56] References Cited

U.S. PATENT DOCUMENTS

| | | | |
|---|---|---|---|
| 3,611,301 | 10/1971 | Parks | 340/172.5 |
| 3,678,391 | 7/1972 | Gough | 325/55 |
| 3,809,910 | 5/1974 | Walker et al. | |
| 3,971,000 | 7/1976 | Cromwell | 340/172.5 |
| 4,028,498 | 6/1977 | Mehaffey et al. | |
| 4,251,865 | 2/1981 | Moore et al. | 364/200 |
| 4,286,118 | 8/1981 | Mehaffey et al. | |
| 4,653,090 | 3/1987 | Hayden | 379/204 |
| 4,698,805 | 10/1987 | Sasuta et al. | 370/97 |
| 4,726,054 | 2/1988 | Molnar | |
| 4,866,764 | 9/1989 | Barker, III | 379/368 |
| 4,901,314 | 2/1990 | Lohrbach | 371/11.2 |
| 4,924,496 | 5/1990 | Figa et al. | 379/142 |
| 4,926,495 | 5/1990 | Comroe et al. | 455/54 |
| 4,928,099 | 5/1990 | Drake | 340/825.28 |
| 4,947,162 | 8/1990 | Kimura | 340/825.08 |
| 4,961,070 | 10/1990 | Maher et al. | 340/721 |

(List continued on next page.)

OTHER PUBLICATIONS

Jones, "The Pye TVT Approach to Audio Controls Systems", International Broadcast Engineer, vol. 6, No. 122, pp. 4–6, 8–11, Mar., 1975.

Ullah, "Master Switching Control Panel for Broadcast Studies", ABV Technical Review (Japan), No. 69 (Jul. 1980).

Motorola Coverage Guide for Smartnet™ System Users (70 page brochure and Table of Contents (pp. 1–15).

Trunking Console System Functional Specification, Console Systems, Inc., Console System Electronics Section 2 (pp. 2-1-2-66).

Motorola Centracom Series II Plus brochure dated Jul. 1, 1988 (6 pages).

Motorola System Planner RC-2-37C, Mar., 1988, "Centracom Series II Control Centers" (pp. 1–42).

Motorola System Planner R4-2-73A, Jul., 1990, "Centracom Series II Plus Control Centers" (pp. 1–46).

Motorola, Inc. Centracom Series II Plus™ CRT Console Operator's Manual (pp. 1–40); Appendix A (pp. 1–6); Glossary (pp. 1–5).

GE C3™ Series, Overview and Introduction, Standard Practice #2.400–1002–01, Jul., 1988.

(List continued on next page.)

*Primary Examiner*—Edward F. Urban
*Attorney, Agent, or Firm*—Nixon & Vanderhye P.C.

[57] ABSTRACT

A dispatcher console for use in a digitally trunked, multisite public service radio system. The dispatcher counsel comprises a personal computer having a co-processor logic board, an audio switching tower, and user I/Os including a customized keyboard, display screen, audio speakers, headset and a transmit foot pedal. The switching tower routes audio communications between the console and multisite switch. The tower is controlled by and connected directly to the co-processor board. The customized keyboard is also connected directly to the co-processor board and has dedicated keys for commonly performed functions. The display screen presents information in a standard format such that the dispatcher knows precisely where to find particular information.

9 Claims, 9 Drawing Sheets

U.S. PATENT DOCUMENTS

| | | | |
|---|---|---|---|
| 4,964,157 | 10/1990 | Aoshima | 379/204 |
| 4,972,457 | 11/1990 | O'Sullivan . | |
| 4,991,197 | 2/1991 | Morris . | |
| 5,046,183 | 9/1991 | Dorst et al. | 379/96 |
| 5,101,502 | 3/1992 | Felderman et al. | 455/53.1 |
| 5,113,431 | 5/1992 | Horn . | |
| 5,130,662 | 7/1992 | Jorgensen et al. . | |
| 5,159,701 | 10/1992 | Barnes et al. | 455/54.1 X |
| 5,169,342 | 12/1992 | Steele et al. | 345/146 |
| 5,175,866 | 12/1992 | Childress et al. | 455/34.1 X |
| 5,200,954 | 4/1993 | Teel, Jr et al. | 455/33.1 |
| 5,223,844 | 6/1993 | Mansell et al. | 342/357 |
| 5,241,537 | 8/1993 | Gulliford et al. | 370/67 |
| 5,548,810 | 8/1996 | Riddell et al. | 455/89 |

OTHER PUBLICATIONS

GE C3™ Series Console Dispatch Center, Standard Practice #2.403–1003–01, Jul., 1988.

GE C3™ Series Maintenance and Administration Position (MAP) User Manual, Standard Practice #2.401–1004–01, Jul., 1988.

GE Mobile Communications C3™ Series Console 16 Plus®, Operators's Manual (LBI–31833A).

Ericsson GE Mobile Communications 16GEMS Multisite Coordinator Maintenance Manual (LBI–38456A).

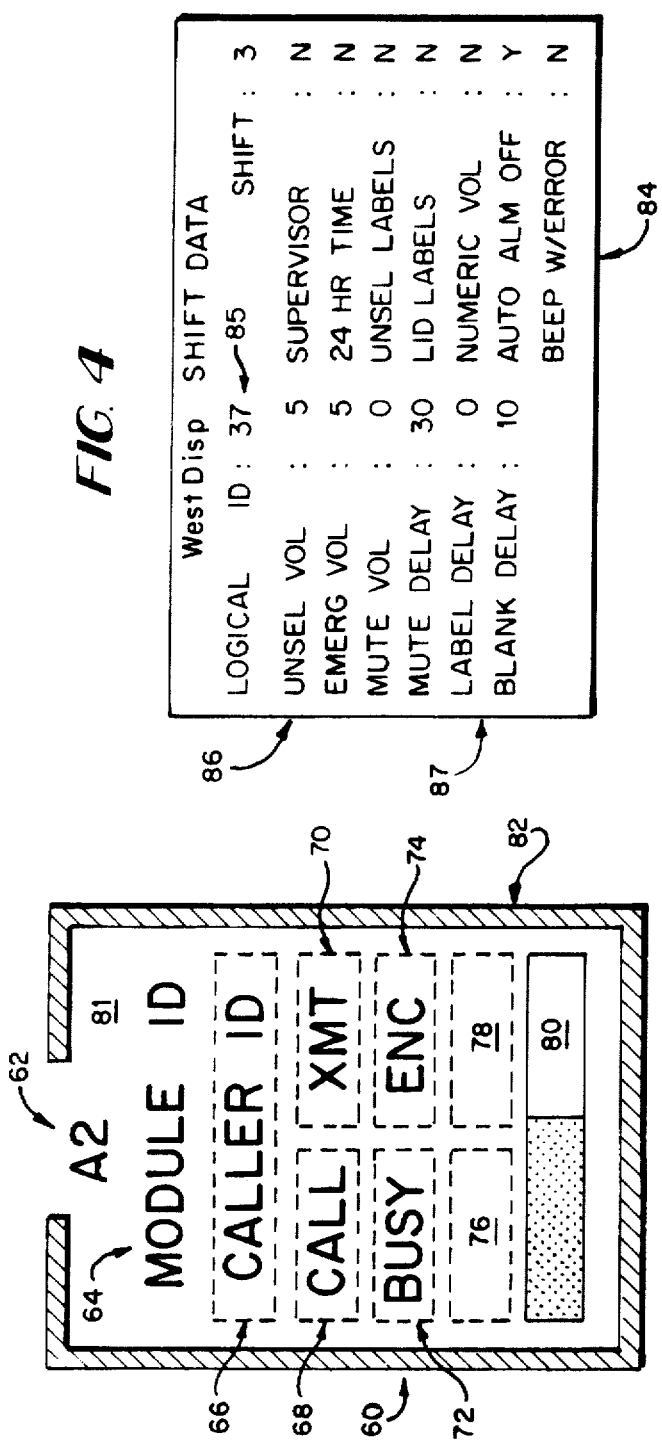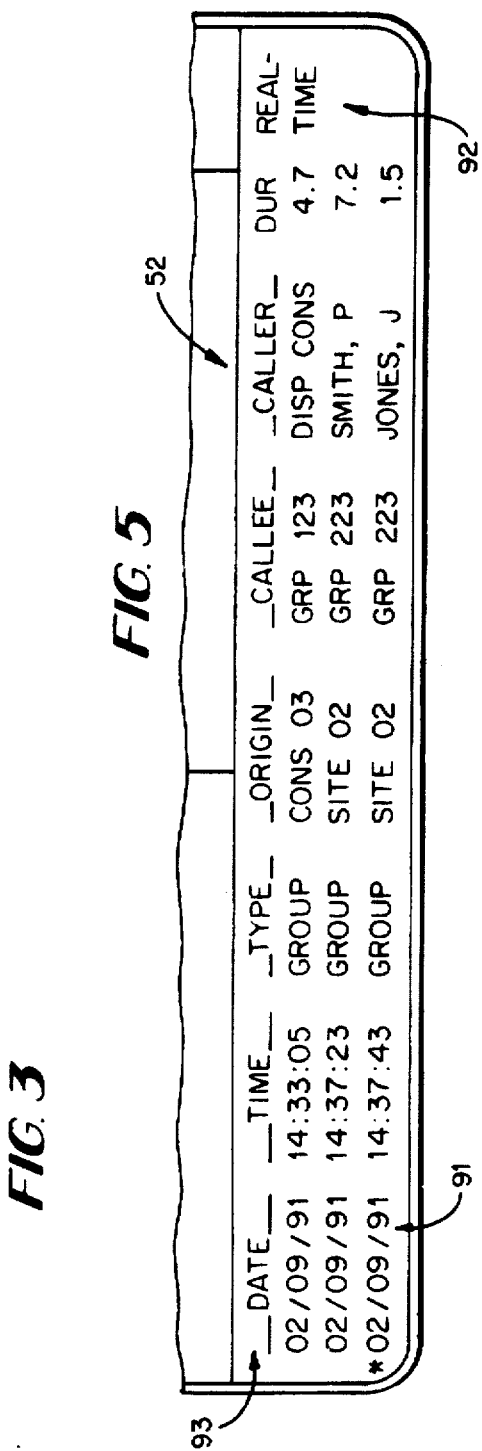

DISPLAY CONSOLE AND USER INTERFACE FOR MULTISITE RF TRUNKED SYSTEM

RELATED APPLICATIONS

This is a continuation-in-part of Ser. No. 825,689 filed Feb. 22, 1991, now U.S. Pat. No. 5,200,954, issued Apr. 6, 1993.

This application is related to the following co-pending and commonly assigned U.S. patent applications:

U.S. Pat. No. 5,384,854, issued Jan 24, 1995, entitled "Co-Processor Controlled Switching Apparatus And Method For Dispatching Console" filed contemporaneously with this application, in the name of James L. Teel, Jr., Stephen R. Downs, and Charles G. Herndon.

Application Ser. No. 07/658,799 filed Feb. 22, 1991, which is a continuation-in-part application to Ser. No. 07/573,977 entitled "Distributed Multisite Coordination System" filed on 28 Aug. 1990 in the name of James L. Teel, Jr.

U.S. Pat. No. 5,200,954, issued Apr. 6, 1993, entitled "Protocol Between Console And RF Trunking System."

U.S. Pat. No. 5,297,354, issued Feb. 15, 1994, entitled "Data Protocol And Monitoring System For RF Trunking Multisite Switch Global Serial Channel."

U.S. Pat. No. 5,239,538, issued Aug. 24, 1993, entitled "Controller Architecture For RF Trunking Distributed Multisite Switch."

U.S. Pat. No. 5,392,278, issued Feb. 21, 1995, "Distributed Multisite Switch Architecture."

U.S. Pat. No. 5,384,776, issued Jan. 24, 1995, entitled "Audio Routing With A Trunked Radio Frequency Multisite Switch."

The disclosure of each of these related applications is incorporated by reference.

FIELD OF THE INVENTION

This invention relates to user interfaces for computerized telecommunication devices. In particular, the invention relates to a public service radio dispatcher console having a cathode ray tube (CRT) display, customized keyboard, and other user interface devices.

BACKGROUND AND SUMMARY OF THE INVENTION

Radio dispatchers work with radio communication systems that are becoming increasingly complex. The number of radio frequency (RF) channels in these systems and the area that a single system covers have increased substantially.

Since more channels are available, the number of system users has increased. In the past, an individual system would have had one police station or one fire department. Now, a single system handles an entire metropolitan government, including the police department, fire department, ambulances, hospitals, and other governmental services. Instead of only communicating with a small number of users, radio dispatchers can now communicate with hundreds, if not thousands, of system users.

These system users, e.g. mobile radio units, hand-held radios, other consoles and conventional radio base stations, are usually grouped by function into agencies, fleets, and groups. The dispatcher has the ability to communicate with individual users or these functional groups. In addition, the dispatcher can patch users and groups together for a specific call. Similarly, the dispatcher can set up a simulselect call by specifically selecting the groups and individual users to participate in the call.

The coverage of RF systems has been dramatically increased by linking several broadcast sites in a multisite network. Multiple transmitting sites are often necessary to provide RF communications to all locations within a given community. Multiple transmitters can accommodate a rural community covering many square miles. Similarly, multiple transmitters may be used in a city having many buildings that obstruct RF signals. Thus, RF systems are no longer confined to a single transmitter.

The complexity of the system from the view of a dispatcher console is substantially increased by additional channels and multiple transmitters. Instead of broadcasting over a single transmitter on a small number of channels, dispatcher consoles now broadcast over tens, hundreds or even a thousand channels distributed over several transmitters covering a wide area or a large city. A single call can be broadcast from several sites over as many different channels. The dispatcher console must now be informed of the individual transmitters and channels that are being used, and of the status of other transmitters and receivers in the system.

Similarly, the complexity of RF systems is also increasing because of numerous additional operation features that have become available for these systems. Previously, RF systems had basic key and unkey call terminate functions. In untrunked systems, calls to selected individuals and groups were made by selecting the appropriate dedicated channel for that group or individual.

With the advent of digitally trunked multisite systems, RF systems can direct calls to individuals or selected group members covered by different radio broadcast sites. These groups can be formed, disassembled and rearranged by the radio dispatcher. Voice calls can be encrypted for security. Telephone line calls can be made or received through the dispatcher console. Moreover, communications can be in the form of data transmission and are no longer just audio communications.

Dispatchers are facing an increasingly complex RF communications systems. This complexity increases the number of choices to be made by the dispatcher in handling communications. Dispatchers cannot be overwhelmed by the operational aspects of the RF system. The dispatchers must be free to concentrate on the substance of the calls, any one of which may be an emergency call. The added features of a complex RF could become a hinderance to the dispatcher, unless the dispatcher is able to quickly and easily operate the dispatch console. Past dispatcher consoles have not been particularly user friendly.

In the prior art, U.S. Pat. No. 4,961,070 discloses a "Radio Console With CRT Display" that allows channel control windows (CCW), representing selected radio channels, to be moved about the display. The CCWs present status information on individual subfleet communication, such as subfleet identification, caller id and whether the call is busy. The CCWs are moved about the display using a computer-mouse interface which also allows the user to operate a menu at the bottom of the display screen. It is believed that this patent discloses the Motorola Centracom II Plus dispatcher console.

Another prior art dispatcher console is the Console Dispatch Center for the C3™ Series Consoles sold by the assignee Ericsson GE Mobile Communications Inc. The C3™ Console is a microprocessor controlled voice switching system. The dispatcher workstation includes a control panel of dials, buttons and small displays corresponding to individual call groups, consoles and other units. Both of these prior art systems present the dispatcher with complicated and non-uniformly displayed information.

There is a need for dispatcher consoles that displays call information in an easy-to-comprehend manner, that can be simply configured to suit individual dispatchers. An inventive dispatch console has been developed that is easy for the dispatcher to operate through a customized keyboard and CRT computer display. The dispatch console includes a standard personal computer (PC) having a novel co-processor logic board; a customized keyboard connected to the co-processor board; a CRT; devices for audio communications such as speakers, earphones, microphones and a push-to-talk foot pedal; and an audio switching tower for routing audio between the dispatch console and multisite switch.

The CRT display screen presents information on ongoing communications throughout the RF system and historical information on recently terminated calls. The display is segmented into functional windows. These windows provide information in a uniform and easy to read manner. For example, information on individual communications is shown in an array of communication module windows. Each communication module provides information on a specific call or group such as the caller, volume, and emergency.

The customized keyboard has been tailored so that certain keys are dedicated to specific radio functions. For example, dedicated keys are provided for transmit, communication module control, patch and simulselect calls, and telephone and intercom communications. Common function keys, e.g. F1, F2, are assigned to control various other functions as needed and in conjunction with display menus.

BRIEF DESCRIPTION OF THE DRAWINGS

FIGS. 3 to 5 illustrate portions of the display screen shown in FIG. 2;

DETAILED DESCRIPTION OF THE DRAWINGS

Figure 1:
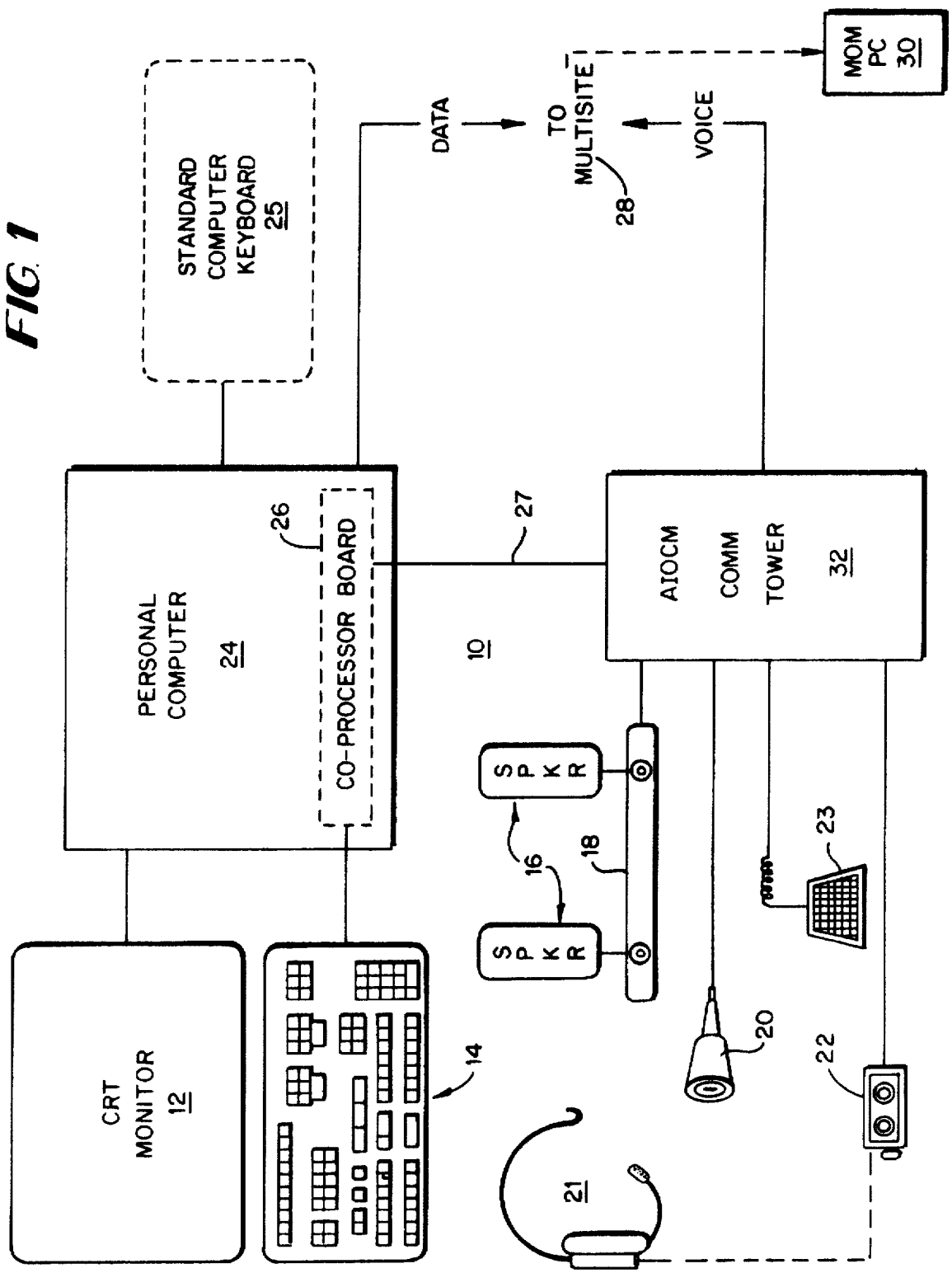
FIG. 1 is a block diagram of a dispatcher console for the present invention.

FIG. 1 shows a dispatcher console 10 having a color CRT monitor 12, a customized dispatch keyboard 14 with 101 labeled keys, audio speakers 16 (in the preferred embodiment each console can have two to twelve speakers), speaker volume controls 18 underneath each speaker, a microphone 20 (or alternatively a headset 21 with volume control 22), and a foot switch 23 that is a push-to-talk switch. The dispatcher need look only at the CRT monitor to operate the console. The dispatch keyboard provides complete control over the console to the dispatcher. However, push-to-talk switches are provided on the microphone 20 and foot pedal 23 for the dispatcher's convenience.

The speakers, microphone, headset and foot pedal are connected to an audio communications tower 32. The CRT monitor 12 and an optional standard keyboard 25 are connected to a conventional personal computer 24. In the preferred embodiment, the personal computer is an AT-class PC computer equipped with VGA graphics, 2 megabytes of RAM, a hard disk and a floppy disk for loading software. The computer uses a proprietary (VRTX) multi-tasking operating system published by Ready Systems, Inc. of Sunnyvale, Calif.

In addition, the computer has an internal co-processor logic board 26 that is further described in U.S. Pat. No. 5,384,854 entitled "Co-Processor Controlled Switching Apparatus and Method for Dispatching Console" and incorporated by reference above. This co-processor board performs the audio and command routing functions necessary for the dispatcher console. The logic board allows a standard personal computer to be converted into a dispatcher console. The customized keyboard 14 is coupled to the logic board and thereby to the personal computer. A standard keyboard 25 may also be connected to the personal computer, but is not necessary for the operation of the dispatcher console.

The dispatcher console 10 communicates with the RF system through a console interface module (CIM) (not shown) in a multisite switch 28. The multisite switch routes audio (voice) and data signals throughout the RF system. By way of the multisite switch, the dispatcher console communicates with the trunked and conventional radio systems coupled to the switch, to telephone lines connected to the switch and to other dispatch consoles. The dispatch console and CIM communicate using the messages and the protocols described in further detail in U.S. Pat. No. 5,200,954 entitled "Protocol Between Console and RF Trunking Switch" and incorporated by reference above.

Individual dispatcher profiles and entity databases are loaded into the hard drive of the dispatcher console personal computer from the MOM-PC 30 via the console-CIM data link to the multisite switch. The MOM-PC is a central control computer for the RF system and is under the control of the system operator for the entire RF system. The operation of the MOM-PC is described in more detail in U.S. Pat. No. 5,566,388 entitled "RF Trunking Multisite Switch Configuration and Diagnostics Interface" and incorporated by reference above.

The hard disk and PC-RAM in the personal computer stores the user profile that identifies among other things, the dispatcher and the user groups in which the dispatcher participates. The profile contains information regarding the preferred console settings for the particular dispatcher and initial radio settings. As each dispatcher sits down at the console, such as at the beginning of a new shift, the dispatcher calls up the appropriate user profile tailored to that dispatcher. The dispatcher can display the user profile by depressing a function key on the customized keyboard.

The personal computer for the console also stores a database of user entities. Each entity is an individual trunked radio unit (e.g. mobile, portable, or console), a radio talk group, or a conventional radio. There can be several thousands of radio entities in a multisite system. Accordingly, PC-RAM storage is used, instead of ROM, because the entity database may be large and changed in real-time. The entity database includes a record of each entity including the entity ID number, type of entity, e.g. unit and group, home site, home group and an eight character ASCII name.

The console personal computer saves some database updates to hard disk immediately, and some updates are saved only on demand. Thus, the database records are loaded from the disk when an operator shift occurs (dispatcher profile change) or at startup. The MOM-PC database and hard disk can be used for back-up storage to the PC-RAM. If the link breaks between the MOM-PC and the console, the console will still have relatively-current database information stored on disk.

The dispatcher console relies on the MOM-PC centralized databases to update and change most of its databases. Since the personal computer is linked to the MOM-PC via the mulitsite switch, it has on-line access to these centralized databases. The MOM-PC can send an entire database, or update information for a database such as a single entity updates to modify the entity database. New data base information can be broadcast on demand by the MOM-PC operator or requested by a console, such as when the console comes back on-line after being off-line for a period of time.

The MOM-PC operator may create multiple dispatcher user profiles for each dispatch console. Having multiple dispatcher user profiles allow different dispatchers, e.g. a dispatcher for each work shift, to configure the dispatch console to the individual requirements for each dispatcher simply by calling up the tailored user profile for that dispatcher. The dispatcher user profiles are stored in the dispatcher console. The dispatcher user profiles can be set up and changed only at the MOM-PC.

In addition, each dispatcher console includes an audio input/output communications module (AIOCM) 32 otherwise known as a communications tower that links the audio channels from the CIM of the multisite switch 28 with the speakers, microphone and the foot pedal of the dispatcher console. The communications tower is an audio routing switch for the dispatcher console. The AICOM is controlled via link 27 by the co-processor logic board 26 in the personal computer. The communications tower and logic board are described in more detail in the related U.S. Pat. No. 5,384,854 entitled "Co-Processor Controlled Switching Apparatus and Method for Dispatching Console" and incorporated by reference above.

The overall RF multisite system serves groups of users and individual users. Each user entity, e.g. mobiles, personals, other dispatcher consoles, and conventional base stations in the RF system has an individual identification (Logical ID). Moreover, generally, each mobile radio unit will be a member of one or more groups. The mobile unit is programmed with the group identification of its member group(s) and participates in calls to its group(s). The groups can be organized by, for example, police precincts, fire department engine units, ambulances and hospitals. Most individual users will participate in a call only if the call involves their group. Individual radio units that are members of more than one group can scan for calls or the unit can be set to listen for a particular group to the exclusion of other groups.

Group identification designations are organized in a four-level hierarchy where (i) the particular group is identified as a sub-fleet, (ii) several groups make up a fleet, (iii) one or more fleets make up an agency, and (iv) the total multisite system is all agencies. Most communications are to particular groups. However, the system allows dispatchers to transmit to an entire fleet, agency or system. System wide calls may be restricted so as to be made only from supervisory dispatcher consoles.

Figure 2:
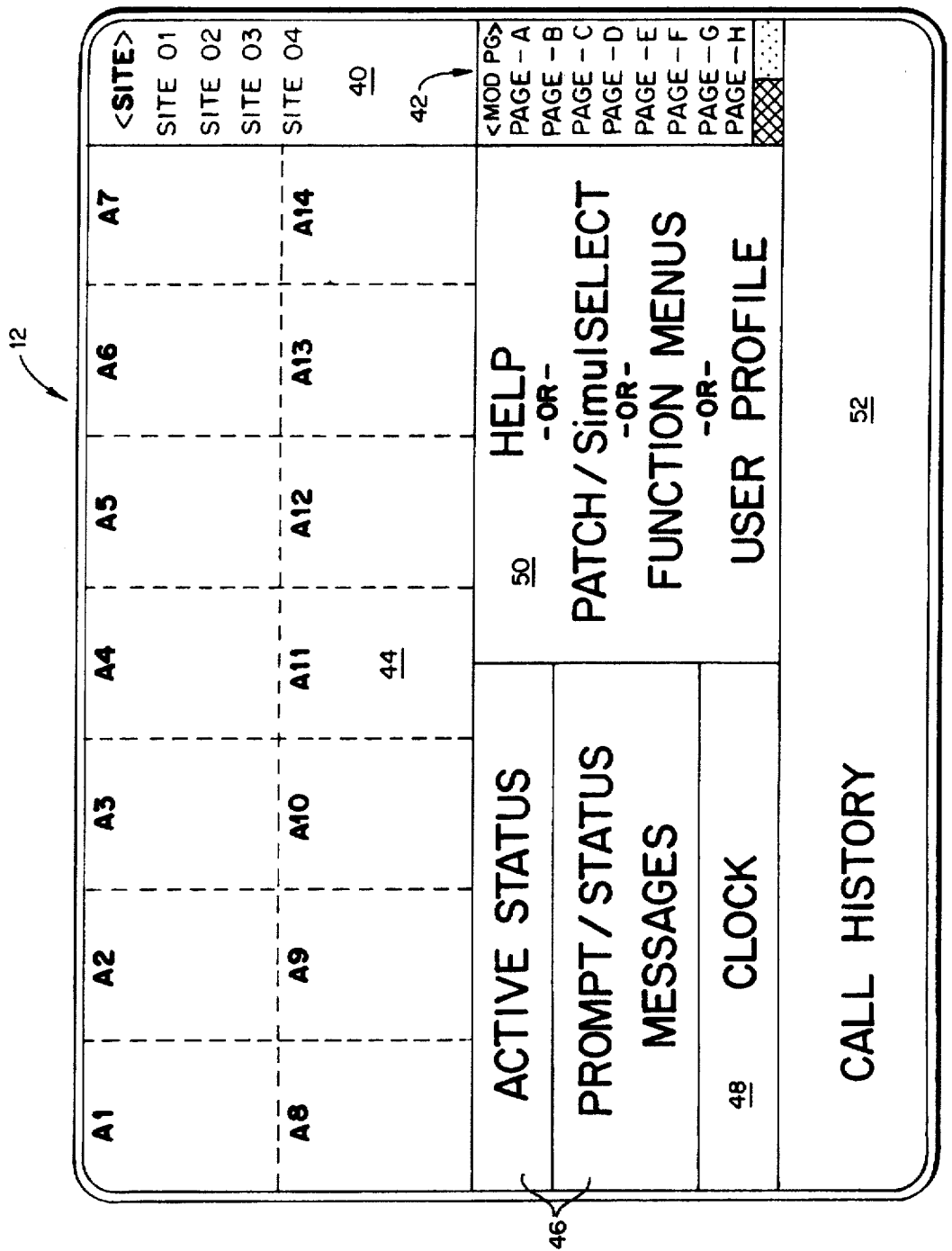
FIG. 2 is a display screen for the dispatcher console shown in FIG. 1.

As shown in FIG. 2 the dispatcher monitor display screen 12 is divided into window segments. These segments provide discrete work areas on the screen. The segments include an entity listing 40, a page listing 42, communications modules 44, status/prompts/messages 46, clock 48, help/call type/menus 50, and call history 52. These segments display information in an organized and regular fashion to the dispatcher.

The arrangement of these segments on the screen does not change. However, the information presented in each window segment does change. Thus, the dispatcher can become familiar and comfortable with the arrangement of the segments on the screen. This familiarity allows the dispatcher to pick out desired information quickly from individual windows because the dispatcher learns precisely where this information is displayed by knowing the location of each segment.

One window segment 40 provides a listing of available entities, e.g. site controllers, groups, units, consoles, conventional channels and telephone lines, in the RF system. Another segment 42 of the display lists the pages of communications modules 44 that can be shown. By segregating the communications modules into pages, the number of communication modules that can be displayed is drastically increased and the individual modules can be appropriately grouped by pages.

Communications module windows 44 are arranged conveniently in columns and rows. These modules provide call access to individual groups, entities, consoles and telephone lines in the system. Each communication module is programmed by the dispatcher to represent a particular group, unit, console, channel, line, etc., that is available to the console. To assist in programming the communications module, the available groups, units, consoles, or channels may be displayed in the listing window 40, e.g. a listing of sites.

FIG. 3 shows a representative communications module 60 from the communications windows segment 44 of the display screen. In the preferred embodiment, each module is allocated seven rows with nine columns per row. The individual fields in each module are: module page and position indicator 62, the module name 64, caller name 66, receiving/emergency call indicator 68, console transmit indicator 70, busy indicator 72 showing that another console is transmitting to the module id, encrypted call indicator 74, patch call designator 76, simulselect designator 78 and volume indicator 80. The background color 81 of the module is changed to red to signify an emergency call and to green to signify the select call. The border 82 for the communications module is highlighted when the module is picked by depressing the corresponding module key 114. A picked module is then modified, muted, selected or changed in volume via keys 118 and 116.

FIG. 4 illustrates a sample dispatcher profile 84 that can be displayed on the screen. The profile presents the logical id for the dispatcher 85, volume settings 86, delay times 87 and other features of the profile. The volume levels can be set such that emergency calls are broadcast louder from the dispatcher speakers than other calls. The dispatcher profile is displayed by depressing keys on the console keyboard.

As shown in FIG. 5, the call history window 52 on the display presents a chronological list of information on recent radio calls. The dispatcher can look to the list of recent calls 91 to determine, for example, who is making calls, which groups have been active, when calls begin and how long they last. The call history information can be even as little as a caller identification. This information allows the dispatcher to better manage the system and the system users.

Normally, the call history operates in a real time mode 92 where the three most recent calls are displayed in the call history window. As a call is terminated, its history comes into view in the call history window. The oldest call displayed is deleted from the window each time another call terminates. The dispatcher can freeze the call history window to "playback" the previous call. Freezing stops the real time mode at a particular point in time. However, only three calls can be displayed in the call history window at any one time.

The dispatch console stores information on more than the three most recent calls. In the preferred embodiment, information on 32 calls are stored in the console dispatch computer.

The dispatcher can scroll the call history window through the history of recent calls by switching the display to the scrolling mode. The scrolling mode is set up by depressing the help key to display a menu for the function keys. This menu identifies the function key, e.g. F2, that calls up the scroll history mode. When in the scrolling mode, the call history window will display information on any of the stored calls. The call history is moved forward or backward, i.e. scrolled, by operation of the up and down arrow keys on the keyboard. While only three call histories are displayed at any one time, a much larger number of call histories can be displayed through scrolling. The dispatcher can revert back to real time mode on the call history window by depressing the appropriate function key identified in the call history window.

The call history window is organized in a bottom-to-top arrangement with the oldest call at the top and most recent call (denoted by an asterisk) at the bottom of the window. A header 93 at the top of the call history window shows column headings identifying each field in the call histories. The header includes a DATE field that shows the date of the call. The size of the field underneath the DATE header is indicated by the mm/dd/yy symbol. Similarly, the time at which the call began is in the filed under TIME, the TYPE of call indicates whether the call was, for example, a group call, the origin identifies the site or console of the caller, the CALLEE identifies, for example, the group involved in the call, the CALLER is self-explanatory and DUR is the duration of the call. The designation REAL TIME 92 indicates that the call history window is continually presenting the three most recently terminated calls.

The dispatcher console obtains the information needed for the call history window from command messages from the multisite switch to the dispatcher console. For example, upon receipt of a call assignment message, the console takes from the message the caller ID, callee ID, and site origination information and stores it in a circular buffer in the personal computer.

Similarly, date and time information is read from the BIOS timer in the PC computer and also stored in a circular buffer. The circular buffer holds information on many calls, 32 calls in the preferred embodiment. To calculate length of call time, the computer waits for an unkey/drop message and then rereads the BIOS timer. The time from the start of the call is subtracted from the time the call ended to calculate call duration. The digital information corresponding to the calls to be displayed is converted to ASCII data and displayed.

The circular file tracks each call by communications module number. For any period of time, the console may receive several channel assignment and unkey/drop messages for a variety of calls on various channels. Each assignment or unkey/drop message contains an identification corresponding to one of the module identification numbers. The computer matches each message to the corresponding module and stores the information in the appropriate circular buffer. There is one buffer for each module. The call history window tracks all calls regardless of their sequence.

Figure 6:
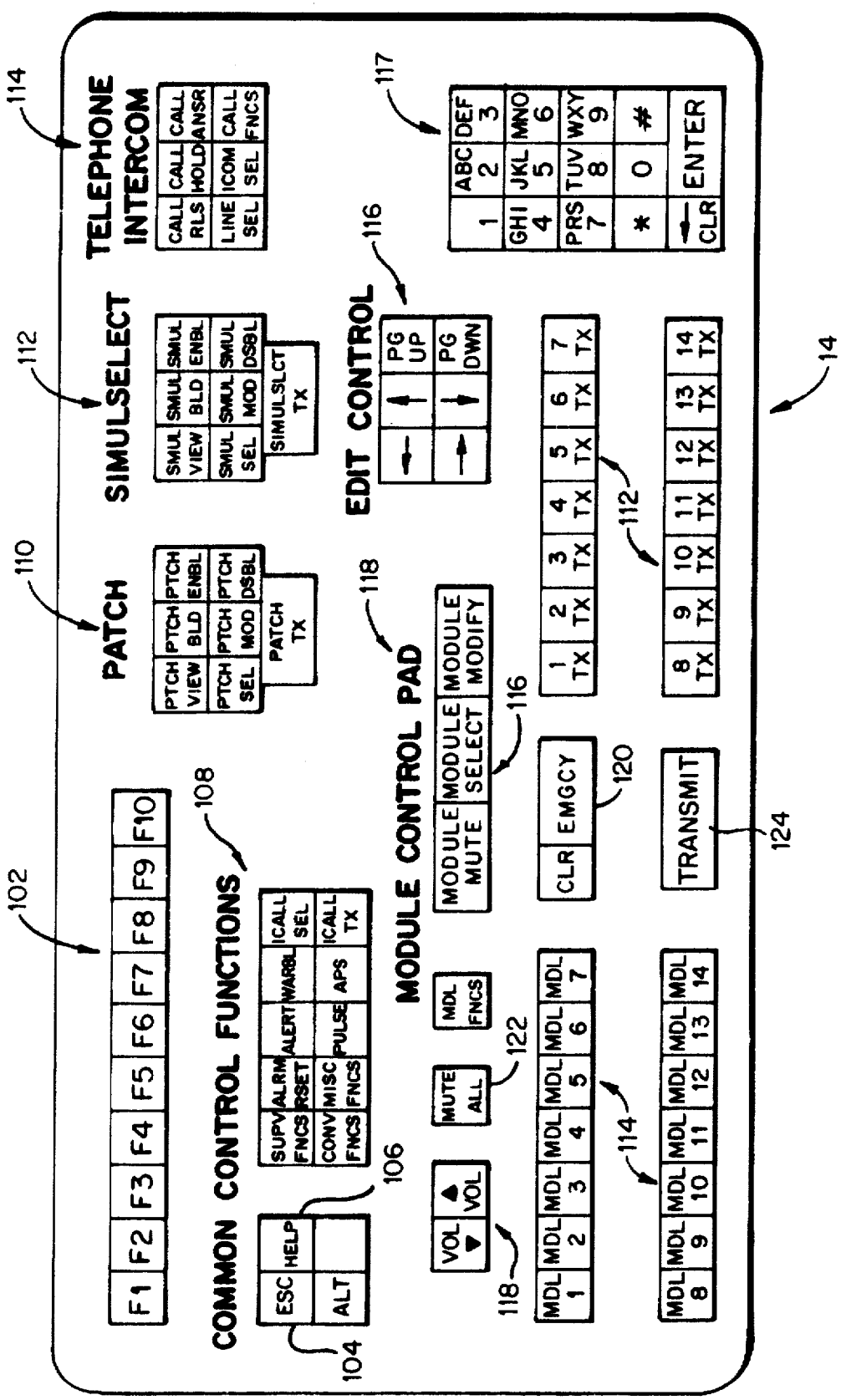
FIG. 6 is a diagram of the customized keyboard shown in FIG. 1.

As shown in FIG. 6, the dispatcher inputs commands to the console through a customized keyboard 14. The keyboard includes alphanumeric and function keys. The function keys are not all assigned to static functions. Alterable functions keys 102 are assigned varying functions depending upon the operation being performed on the console. The user can perform a specific function on the console by depressing the appropriate function key. A dedicated escape key 104 allows the user to cancel an ongoing operation. Instruction information regarding the operation of the console and each function key is provided through a help window on the display accessed via a dedicated help key 106.

The alterable function keys 102 are each assigned a default function that applies unless over ridden by a screen displayed menu. These default functions include calling up the user profile screen, changing the user profile because of a shift change, signing onto the computer system, and toggling the call history window. The help key can be used to display a menu of these default function settings.

The dedicated function keys always perform the same function and are grouped with other keys of related functions. For example, the HELP 106 and ESCAPE 104 keys are grouped with the common control functions 108. In addition, calls to individual units are made through the ICALL SEL and ICALL TX keys, 108, that allow the dispatcher to enter the unit identifier through the alphanumeric keypad 117.

As can be seen, the more common functions are assigned dedicated function keys include the establishing of patch 110, simulselect 112 and telephone/intercom communications 114; edit control 116 such as paging through screen displays and cursor and position control on the display; muting the console speakers 122; and emergency condition 120. A dedicated color coded key 124 sends a push-to-talk command over the selected communications module. The foot switch 23 can also serve this transmit function. Transmissions to any other module is made by depressing the TX key 112 corresponding to the communications module.

Through the use of the customized keyboard, the dispatcher can choose a particular communications module by depressing the appropriate key 114, e.g. MDL 3, to pick module 3. Once this module has been picked, then the dispatcher can adjust its volume via volume keys 118, mute the module, 116, highlight the module for the select speaker (may be headset), modify the module, 116, or establish (or clear) an emergency condition for the module 124.

When the module modify key is pressed, a menu screen is displayed assigning new functions to the alterable functions keys 102. These assigned functions allow the dispatcher to re-program the module to a new unit, group, conventional channel, telephone line, or console.

Figure 7:
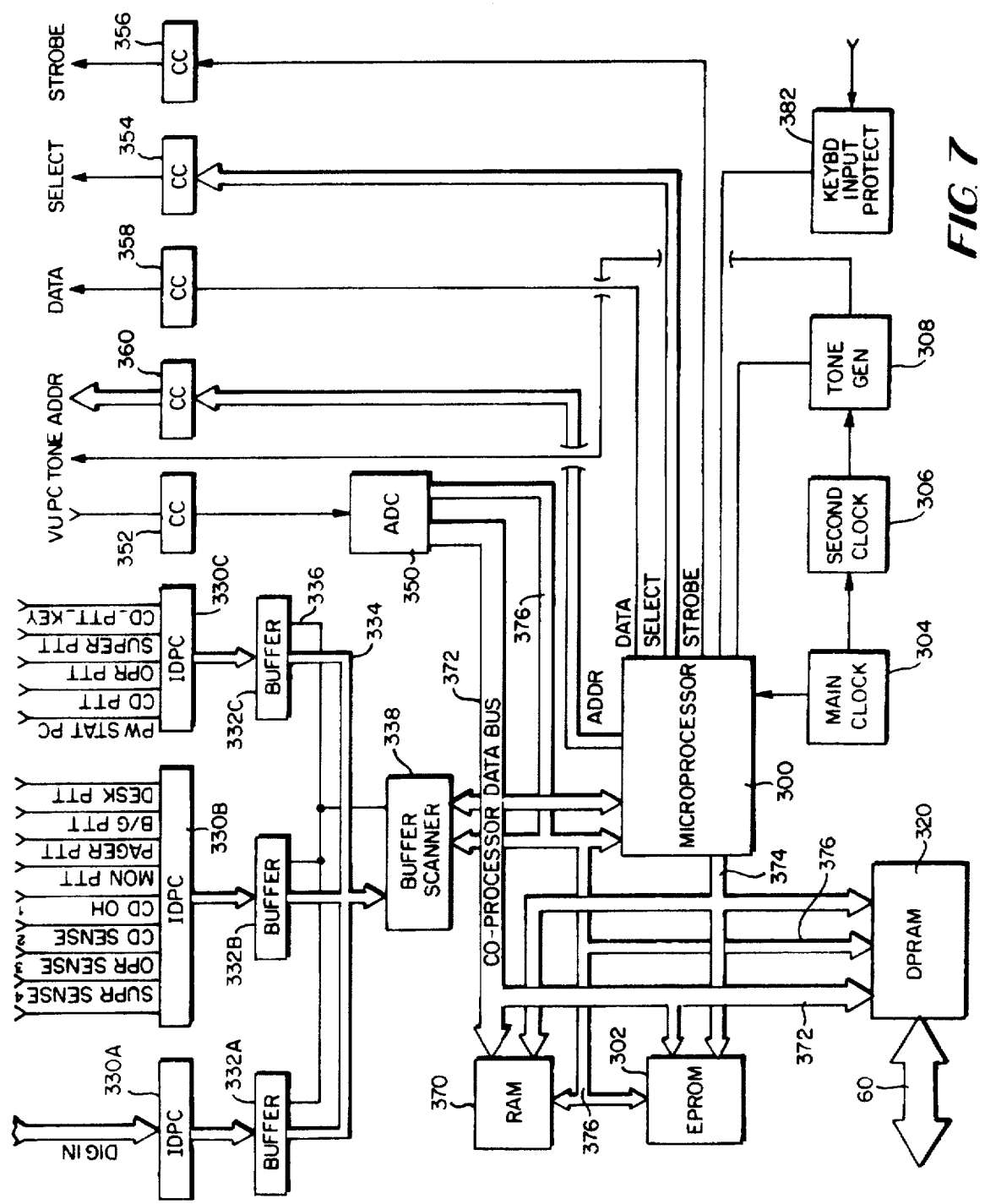
FIG. 7 is a block diagram of the co-processor board in the personal computer shown in FIG. 1.

The co-processor logic board is shown in further detail in FIG. 7. The heart of the co-processor board is a microprocessor 300 which, in the illustrated embodiment, is a 80C152 microprocessor. Firmware executed by the microprocessor 300 is stored in an EPROM 302. The microprocessor 300 receives timing signals from a main clock 304, which also supplies timing signals to a second clock 306. Pulses from the second clock 306 are utilized by a tone generator 308, which, in turn, produces the signal TONE for application to the audio tower 32 via an interface cable.

Further included in the co-processor system is a dual port RAM (DPRAM 320). The DPRAM 320 handles the communication between the microprocessor 300 and the main processor system in the PC over a bus connector 60.

The co-processor is connected to the audio tower by an interface cable. The co-processor system has a plurality of inverting and diode protection circuits (IDPCs) 330 for conditioning input signals received on the interface cable. The particular input signals applied to each of the IDPCs are shown in FIG. 7, and are primarily digital input signals, jack sense signals, and push-to-talk (PTT) signals.

The conditioned signals received from the audio tower 32 are applied to an appropriate one of three octal tri-state buffers 332 (shown as buffers 332A, 332B and 332C). The buffers 332 are connected by a buffer data bus 334 and a buffer control bus 336 to a buffer scanner 338. In the illustrated embodiment, the buffer scanner 338 is a keyboard scanner chip.

The co-processor logic board also includes an analog-to-digital converter (ADC) 350 for converting a signal VU PC received from the VU meter amplifier circuit 222 (in the audio tower 32). Prior to application of the VU PC signal to the ADC 350, the VU PC signal is conditioned by a conditioner circuit (CC) 352. The conditioner circuit 352 includes protection diodes and an operational amplifier.

Selected pins of the microprocessor 300 are connected to apply signals to the audio tower. In this respect, pins P5.0–P5.3 are connected to form a bus for carrying a SELECT signal; pins P4.1 is connected to carry a STROBE signal; pin P4.0 is connected to carry a DATA signal; and pins P6.0–P6.5 are connected to carry an ADDR signal. The SELECT, STROBE, DATA and ADDR signals are conditioned by respective conditioning circuits 354, 356, 358 and 360, respectively, prior to application to the interface cable. The conditioning circuits 354, 356, 358 and 360 essentially are inversion (with pull-up) and diode protection circuits.

In addition to the EPROM 302 and the DPRAM 320, the co-processor logic board includes random access memory (RAM) 370. The microprocessor 300 is connected by a co-processor data bus 372 to the ADC 350, the buffer scanner 338, the RAM 370, the EPROM 302, and the DPRAM 320. The microprocessor 300 is connected by a co-processor address bus 374 to the RAM 370, the EPROM 302, and the DPRAM 320. Further, in conventional manner, the microprocessor 300 is connected by a co-processor control bus 376 to the ADC 350, the buffer scanner 338, the RAM 370, the EPROM 302 and the DPRAM 320.

As indicated in FIG. 1, the co-processor keyboard 14 is connected to the co-processor. A signal from the co-processor keyboard is applied to a keyboard input protection circuit 382 prior to application to the microprocessor 300. The keyboard input protection circuit 382 provides inversion and diode protection functions.

Figure 8:
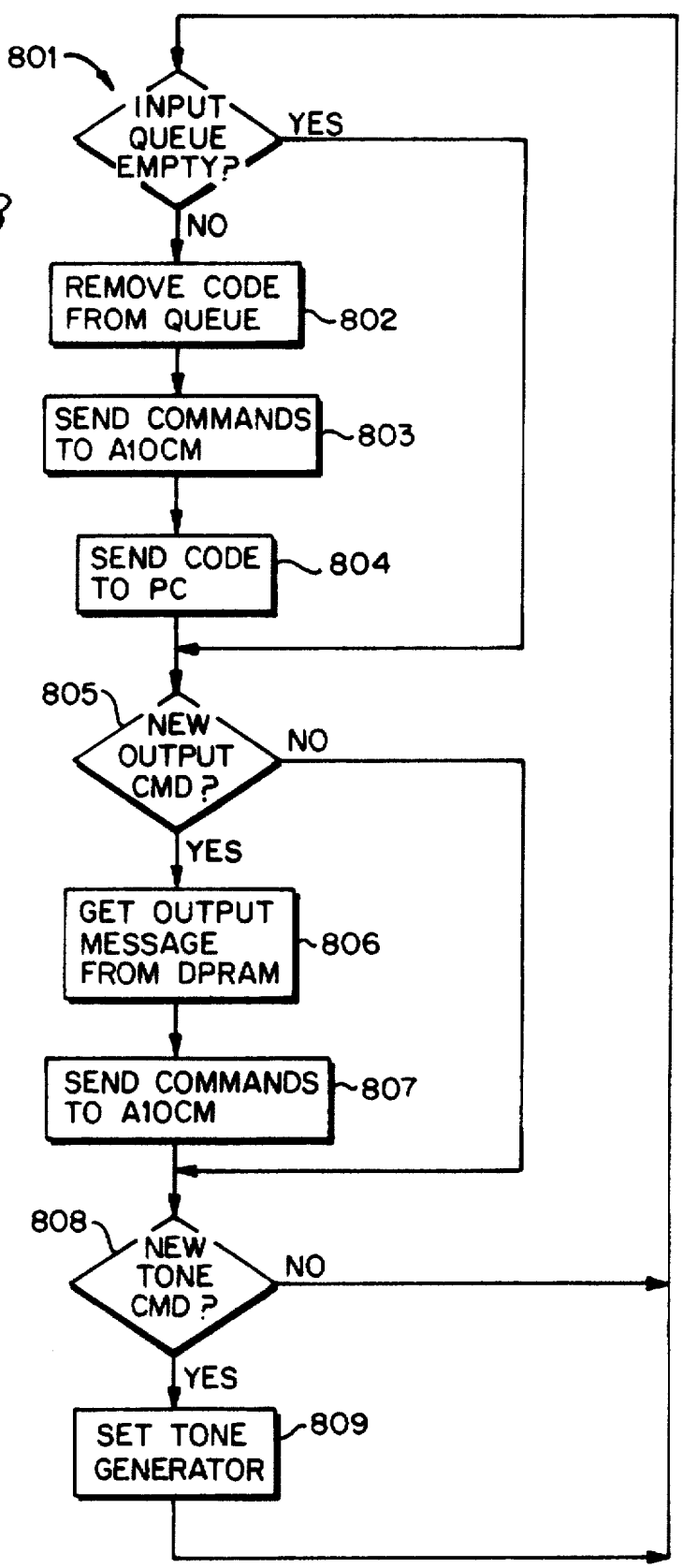
FIGS. 8 to 11 are software process flowcharts showing the operation of the co-processor board illustrated in FIG. 7.

The software routines performed by the co-processor board monitor the keyboard, scan inputs and other inputs for command messages. FIG. 8 shows the over all main processing loop. In step 801, the process checks whether its input queue is empty. If an input is in the queue, then the message code is retrieved, step 802, and the commands necessary in view of the message are issued to the audio tower (AIOCM) step 803. Similarly, the code is stored in the DPRAM 320 and an interrupt is sent to the PC microprocessor in step 804.

If the input queue is empty (see FIG. 9), step 801, or once the queue code has been acted upon 803 and the PC interrupted 804, a check is conducted for an output command, step 805. If the message number for the retrieved command with the processed indices for the DPRAM 320 are not equal, then a new command exists, step 806, and it is retrieved from the DPRAM. The commands necessary in view of DPRAM message are issued to the AIOCM, in step 807. Finally, a check for a new tone command is conducted in step 808. If a new tone is needed, then the tone generator is set to sent the tone for a predetermined period of time (duration timers are set) in step 809. Once these checks for commands have been completed, another command check begins.

Figure 9:
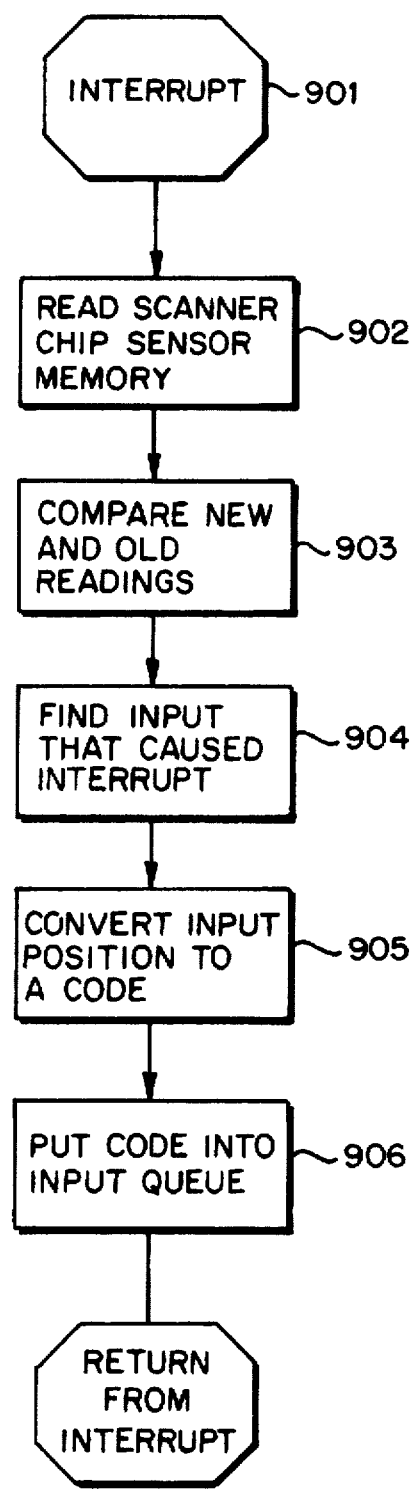

As shown in FIG. 9, the scanner chip monitors the external inputs. When an input change is detected, the scanner interrupts the main microprocessor in the co-processor board in step 901. The microprocessor then reads the scanner memory to determine which input has changed, in step 902. This determination is done, in step 903, by comparing the current status of the scanner memory with the last scanner memory state that is stored and, thus, available to the microprocessor. Thus, multiple inputs can occur while the microprocessor is running other programs. The inputs will be properly processed when the scanner interrupt detection routine is conducted.

Once the input (or inputs) that caused the interrupt is determined, step 904, the microprocessor generates the code corresponding to that input in step 905. The code (or codes) is then stored in the input queue in step 906, and the interrupt routine completed.

In this way, the main processing loop (FIG. 8) picks up the input through a code in the input queue and sends the code to the input processing routines.

An external clock 304 provides pulses to the internal counter in the co-processor board's microprocessor. This internal counter interrupts the microprocessor, e.g. every 10 milliseconds, to trigger a timer service routine. This routine checks flags, decrements active software timers, and checks for active software timers that have been decremented to zero. Depending on which active software timer reaches zero, the control logic of the co-processor board issues a key code, updates the VU meter value being displayed in each communications module on the screen, or changes flags and timers related to tone generator sequences.

Figure 10:
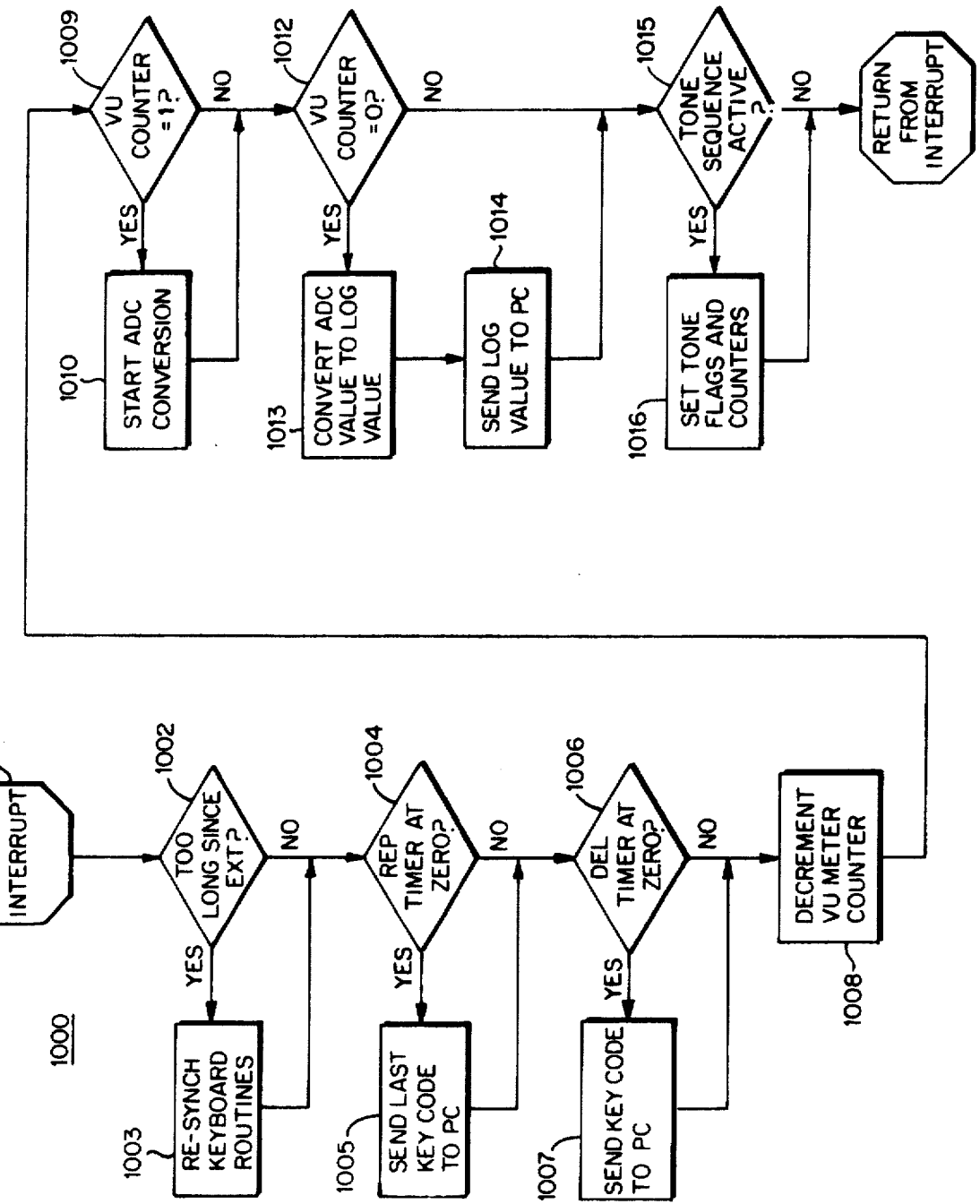

As shown in FIG. 10, the co-processor board microprocessor is interrupted by its internal counter in step 1001. The interrupt calls up the timer interrupt processing routine 1000. The microprocessor first checks whether too much time has elapsed since receiving the last extended (EXT) code, and, if so, re-synchronizes the keyboard routines in steps 1002 and 1003. If step 1002 yields a yes, then the flags are re-synchronized to be ready for the next code which is expected to be an extended code. The EXT code is the first byte of a 2-byte code sent to the co-processor logic board 26 each time a key is depressed on the keyboard 14.

If the repeat timer for a key depression is at zero, step 1004, then the last key code is resent to the personal computer in step 1005. The dispatcher user will hold down a key to signal that a particular key function is to be repeated, such as scrolling. Similarly, when the emergency declare key 120 is depressed, a delay timer, e.g. 1 sec., starts in order to delay the issuance of the key code to the personal computer. This delay ensures that the emergency key is held down for a full second and not inadvertently depressed. In steps 1006 and 1007, the key code is issued when the delay timer reaches zero.

The displayed VU meter is updated regularly by the co-processor. The co-processor decrements a counter each time it runs its timer interrupt processing routine, in step 1008. When the VU counter equals one (1), step 1009, the co-processor starts an analog-to-digital conversion (ADC) from data indicative of the volume level on the select and I/O input. Thus, when the VU counter reaches zero, step 1012, the co-processor converts the new ADC value to a logarithmic (LOG) value, step 1013, and sends the log value to the personal computer, step 1014. The personal computer then updates the displayed VU meter.

Finally, the timer interrupt processing routine checks whether the tone sequence is active, step 1015, and, if so, sets the tone flag counters, step 1016. These flags are used to turn tones on/off and to change the generator frequency for warble tones, when the timer expires, the flags are set so that the tone sequence continues for a predetermined number of cycles. Then, the co-processor returns from the timer interrupt routine until 10 milliseconds later when it is again interrupted by the logic board's internal clock counter.

The customized keyboard is connected directly to the co-processor logic board. When a key is pushed or released, the keyboard sends a two-byte character sequence to the co-processor logic board. The first character byte is an extended code (EXT) that identifies whether the depressed key is in a normal or ALT mode, or whether the key has been released. The second character byte is the key scan code that identifies the key on the keyboard. Based on the particular key codes, the key may be set up with a repeat or delay counter.

Figure 11:
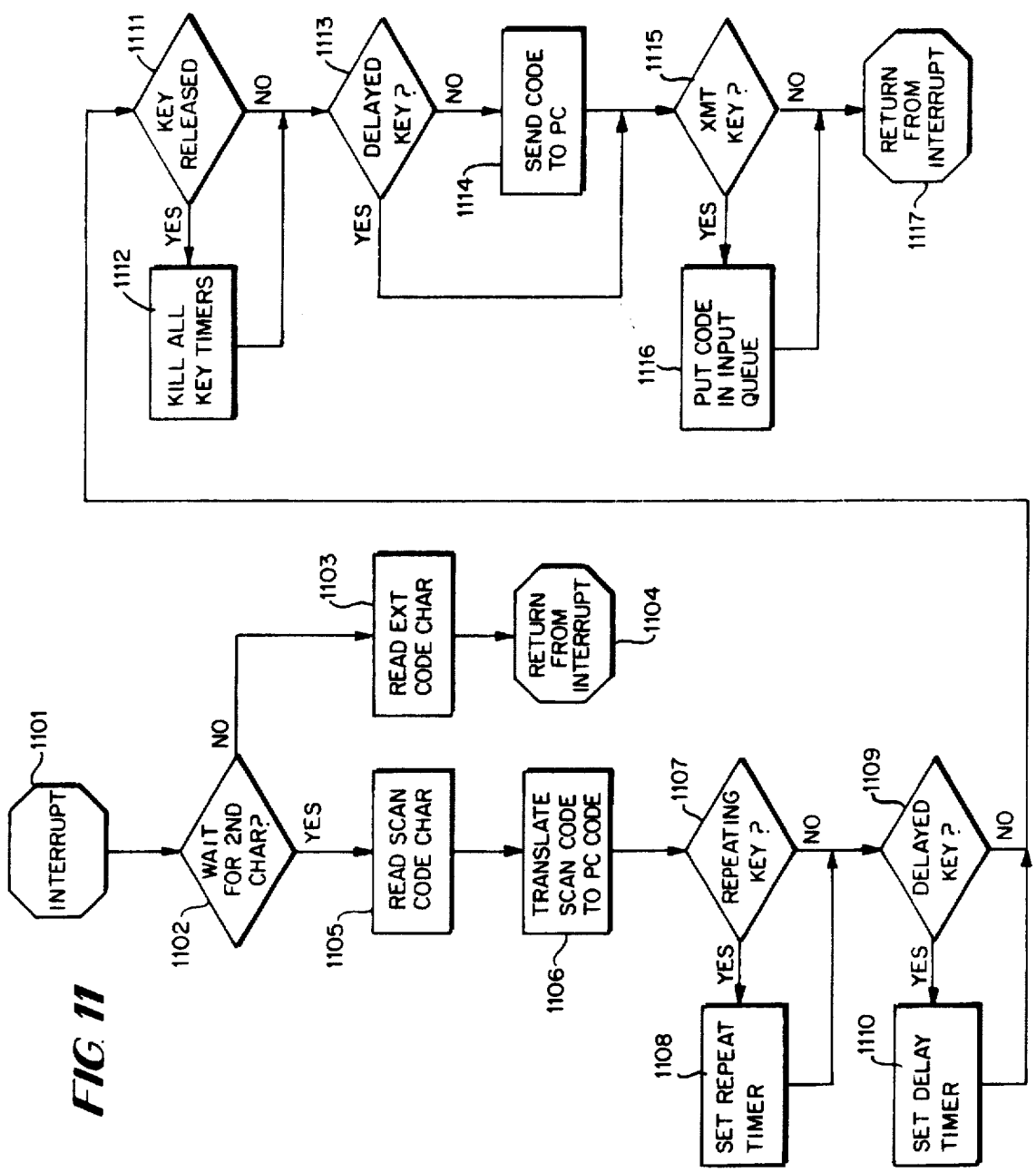

As shown in FIG. 11, the co-processor is interrupted when it receives the first character byte from a key press or release, in step 1101. If the co-processor is not waiting for the second byte of the code, step 1102, then the co-processor reads the extended code, step 1103, and returns from the interrupt, step 1104. The extended code is stored, and the co-processor waits for the second byte interrupt.

If a second character byte is expected, step 1102, then the scan character code is read from this second byte, step 1105, and translated into PC code, in step 1106. If a repeating or delayed key is depressed, then a repeat timer or delay timer is set as is appropriate, steps 1107 to 1110. Similarly, if the key is released, step 1111, then these key timers are terminated, step 1112.

Unless a delay key has been depressed, step 1113, the translated PC code is sent to the personal computer, in step 1114. The code from a delayed key is sent after the delay timer expires. If the transmit key is depressed, step 1115, its code is loaded into the input queue, step 1116, and then acted upon when the co-processor next executes its main loop processing routine. Finally, the microprocessor returns from its interrupt routine, step 1117.

The invention has been described in connection with what is presently considered to be the most practical and preferred embodiment. The invention is not limited to the disclosed embodiment. It covers various modifications and equivalent arrangements included within the spirit and scope of the appended claims.

What is claimed is:

1. In a public service radio system including a multisite switch, a dispatcher console operatively coupled to said multisite switch, said console comprising:

a personal computer including a co-processor board, a display screen, and a keyboard directly connected to said co-processor board, said co-processor board communicating command messages from said computer to an audio switching tower, said tower routing audio communications between said multisite switch and audio input/output devices at said console;

wherein said display screen is segmented into windows including a window of communication modules, said communication modules presenting information regarding individual system groups, said communication modules having a module background color distinctive of a background color for said display screen, the module background color of an individual communication module changes when a predetermined key or key sequence is activated on said keyboard.

2. A dispatcher console as in claim 1 wherein said module background color changes to red in a predetermined communication module when an emergency key or key sequence is activated on said keyboard.

3. A dispatcher console as in claim 1 wherein said module background color changes to green in a select communication module when a predetermined key sequence is activated.

4. In a public service radio system including a multisite switch, a dispatcher console operatively coupled to said multisite switch, said console comprising:

a personal computer including a co-processor board, a display screen, and a keyboard directly connected to said co-processor board, said co-processor board communicating command messages from said computer to an audio switching tower, said tower routing audio communications between said multisite switch and audio input/output devices at said console, wherein said personal computer stores historical information on numerous terminated audio communications in said system, and wherein said display screen is segmented into windows including a call history window, said call history window presenting historical information partially listing said numerous terminated audio communications, said call history window being operable in a real time mode whereby historical information on the most recent terminated calls is presented, and operable in a scrolling mode whereby historical information is presented in a scrolling manner on other of said numerous audio communications.

5. A dispatcher console as in claim 4 wherein said call history window presents the elapsed time of terminated communications and wherein said elapsed time is the time between a call initiation message and a call termination message as received by said console from said multisite switch.

6. In a public service radio system including a multisite switch, a dispatcher console operatively coupled to said multisite switch, said console comprising a personal computer including a co-processor board, a display screen having a window of communication modules, and a keyboard directly connected to said co-processor board, a method for transmitting from said console comprising the following steps:

a. selecting an individual communication module as the select module by depressing a dedicated key corresponding to that individual communication module and then depressing a module select key;

b. transmitting an audio signal over the multisite system to a group corresponding to the select module by activating a transmit key; and c. transmitting an audio signal over the multisite system to another group other than the select group by depressing a transmit key dedicated to a communications module for that another group.

7. A method as in claim 6 wherein the step of transmitting to a group corresponding to the select module is initiated by depressing a key on a microphone at the dispatcher console.

8. A method as in claim 6 wherein the step of transmitting to a group corresponding to the select module is initiated by depressing a pedal on a foot activated switch.

9. In a public service radio system including a multisite switch, a dispatcher console operatively coupled to said multisite switch, said console comprising:

a memory storing historical information on numerous terminated audio communications in said system, and a display screen operatively coupled to said memory, said display screen being segmented into windows including a call history window, said call history window presenting historical information partially listing said numerous terminated audio communications, said call history window being operable in a real time mode whereby historical information on the most recent terminated calls is presented, and operable in a scrolling mode whereby historical information is presented in a scrolling manner on other of said numerous audio communications.

* * * * *